United States Patent
Kouznetsov et al.

(10) Patent No.: US 7,055,036 B2
(45) Date of Patent: *May 30, 2006

(54) SYSTEM AND METHOD TO VERIFY TRUSTED STATUS OF PEER IN A PEER-TO-PEER NETWORK ENVIRONMENT

(75) Inventors: Victor Kouznetsov, Aloho, OR (US); Charles L. Vigue, Lapine, OR (US); Martin Fallenstedt, Beaverton, OR (US); Daniel Melchione, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 963 days.

This patent is subject to a terminal disclaimer.

(21) Appl. No.: 09/922,329

(22) Filed: Aug. 2, 2001

(65) Prior Publication Data

US 2003/0233551 A1  Dec. 18, 2003

Related U.S. Application Data

(60) Provisional application No. 60/298,681, filed on Jun. 15, 2001, provisional application No. 60/282,333, filed on Apr. 6, 2001.

(51) Int. Cl.
*H04L 9/00* (2006.01)
*H04L 9/32* (2006.01)
*G06F 15/16* (2006.01)

(52) U.S. Cl. .......... 713/176; 726/10; 709/219
(58) Field of Classification Search ........ 713/176; 709/201, 203, 219; 717/172–173; 705/75; 726/10

See application file for complete search history.

(56) References Cited

U.S. PATENT DOCUMENTS

| | | | |
|---|---|---|---|
| 6,381,741 B1 * | 4/2002 | Shaw | 717/168 |
| 6,742,023 B1 * | 5/2004 | Fanning et al. | 709/219 |
| 6,789,204 B1 * | 9/2004 | Abdelnur et al. | 713/201 |
| 6,816,900 B1 * | 11/2004 | Vogel et al. | 709/225 |
| 2002/0169842 A1 * | 11/2002 | Christensen et al. | 709/206 |
| 2004/0199474 A1 * | 10/2004 | Ritter | 705/65 |
| 2005/0015721 A1 * | 1/2005 | Tsai | 715/513 |

OTHER PUBLICATIONS

Copy of Office Action from U.S. Appl. No. 09/921,521 which was mailed on May 3, 2005.

* cited by examiner

*Primary Examiner*—Emmanuel L. Moise
*Assistant Examiner*—MinhDieu Nguyen
(74) *Attorney, Agent, or Firm*—Zilka-Kotab, PC; Christopher J. Hamaty

(57) ABSTRACT

A system and method for verifying that a peer is a trusted peer using signed receipts in a peer-to-peer network environment are disclosed. The method generally comprises broadcasting a request over the network by a requesting peer for a task with respect to a remote non-local backend server, receiving a response to the request from the service-providing server, verifying a digital certificate of the response issued by the remote non-local backend server indicating that the responding service-providing server is trusted for the requested task, and forwarding the task to a local alias URL of the responding peer for performance of the task by the responding server if the verifying is successful. The digital certificate may be a 1024-bit VeriSign digital certificate. The verifying ensures that the local alias URL is approved by the non-local backend server for the requested task.

11 Claims, 10 Drawing Sheets

SYSTEM AND METHOD TO VERIFY TRUSTED STATUS OF PEER IN A PEER-TO-PEER NETWORK ENVIRONMENT

CROSS REFERENCE TO RELATED APPLICATIONS

This application claims the priority benefit of U.S. Provisional Patent Application No. 60/282,333, entitled "System and Method for Efficient Use of Bandwidth and Resources in a Peer-to-Peer Network Environment" and filed Apr. 6, 2001 and U.S. Provisional Patent Application No. 60/298,681, entitled "System and Method for Efficient Updating of Virus Protection Software and Other Efficient Uses of Bandwidth and Resources in a Peer-to-Peer Network Environment" and filed Jun. 15, 2001, both of which are incorporated herein by reference in their entireties.

BACKGROUND OF THE INVENTION

1. Field of the Invention

The present invention relates generally to a system and method for securely confirming performance of a task by a peer in a peer-to-peer network environment. More specifically, a system and method for verifying that a peer is a trusted peer using signed receipts in a peer-to-peer network environment are disclosed.

2. Description of Related Art

Conventionally, to obtain anti-virus product updates and/or signature files, computers rely on a pull approach in which each client or server computer must retrieve the updated anti-virus file directly from a source via the Internet. For a computer network, a network administrator may allow anti-virus signature files to become out of date because there are simply too many clients on the network for effective management. Alternatively, the network administrator may schedule the clients to automatically pull the updated anti-virus file from the Internet when each client logs onto the computer. However, such an approach can result in a bandwidth crunch such as in the early morning work hours when most users log onto their computers.

Connections to the Internet from within an organization, particularly from a small to medium sized organization, may be relatively slow. For example, a small to medium sized business may share a single cable or DSL modem, a 56K modem, or an ISDN line. In contrast, in a typical work group interconnected via a LAN, connections on the LAN are generally much faster, the typical LAN being 100/TX (100 Mbps). Peer-to-peer networks thus partially address the need for efficient use of bandwidth and resources in a computer network.

In addition, some peers in a network may be restricted from accessing the Internet. Thus, various service providers on a peer-to-peer network may be requested to perform certain actions on behalf of other peers on the network, such as tasks that require access to the Internet. However, conventionally, any given peer on the network potentially may be able to specify that it is capable of performing the requested service while the requesting peer does not have a way to verify that the responding peer is trusted.

Thus, it is desirable to provide a system and method for an efficient and effective way for a requesting peer to securely verify that a responding peer is trusted.

SUMMARY OF THE INVENTION

A system and method for verifying that a peer is a trusted peer using signed receipts in a peer-to-peer network environment are disclosed. The peering service system and method facilitate in spreading load amongst peers in a distributed network interconnected via a LAN in a smooth, secure and scalable way. The service provider selection from among the peers is preferably achieved through an automatic selection process using signed certificates to authenticate the legitimacy of each potential service provider. Upon completion of the selection process, the selected service provider optionally transmits a broadcast message over the network to notify all other peers of the outcome of the selection process.

It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

According to a preferred embodiment, the method generally comprises broadcasting a request over the network by a requesting peer for a task with respect to a remote non-local backend server, receiving a response to the request from the service-providing server, verifying a digital certificate of the response issued by the remote non-local backend server indicating that the responding service-providing server is trusted for the requested task, and forwarding the task to a local alias URL of the responding peer for performance of the task by the responding server if the verifying is successful. The digital certificate may be a 1024-bit VeriSign digital certificate. The verifying ensures that the local alias URL is approved by the non-local backend server for the requested task.

The method may further comprise placing the responding server node in a black list of the requesting peer for the requested task and/or awaiting for another response from another service-providing server if the verifying is unsuccessful. In addition, the method may include broadcasting a message indicating that the requesting peer has located the responding service-providing server. The request preferably specifies a post method and the local alias URL generally points to a destination on a responding server node. The requested task is typically an uploading task such that forwarding of the task to the local alias URL includes forwarding a file to be uploaded to the remote non-local backend server.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for verifying that a peer is a trusted peer using signed receipts in a peer-to-peer network environment are disclosed. The peering service facilitates in spreading load amongst peers in a distributed network interconnected via a LAN in a smooth, secure and scalable way. A service or an application that is service-enabled may minimize or reduce the usage of, for example, Internet bandwidth by attempting to locate a local aliased copy of a requested resource residing within the peer-to-peer network. If a local aliased copy of the requested resource is located, the requesting computer may obtain the requested resources locally. Once the requesting computer obtains a copy of the requested resource, whether locally or remotely, the requesting computer may itself become a server for the aliased copy for subsequent requests for the resource.

The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
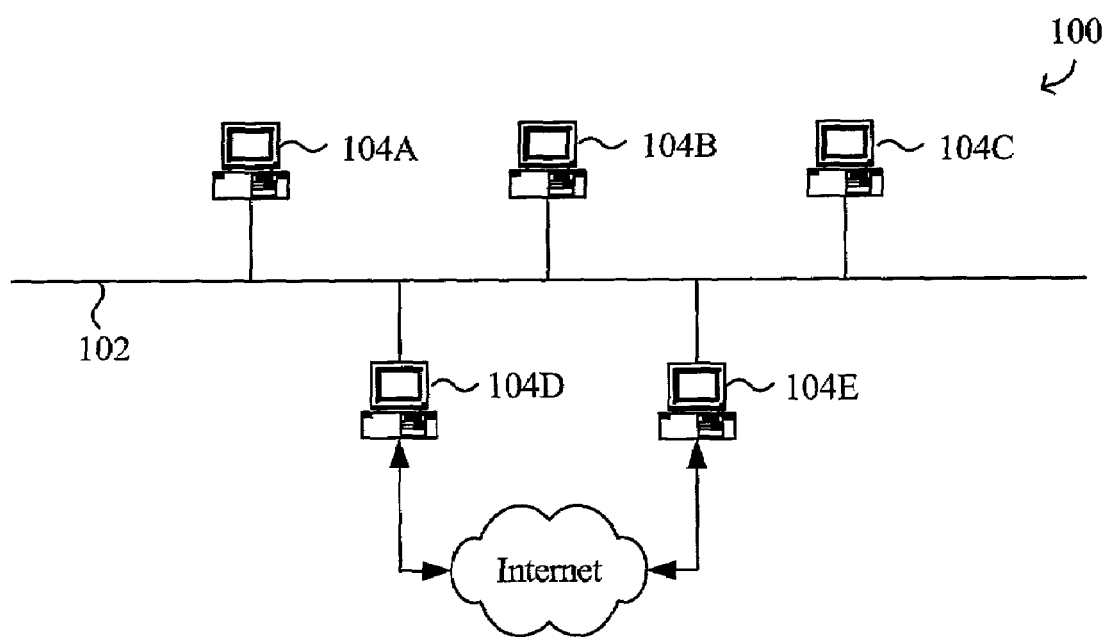
FIG. 1 is a block diagram of an exemplary computer network suitable for implementing a peering service in a peer-to-peer network to facilitate efficient use of bandwidth and resources.

FIG. 1 is a block diagram of an exemplary computer network 100 suitable for implementing the peering service in a peer-to-peer network to facilitate efficient use of bandwidth and resources as described herein. In particular, the computer network 100 comprises nodes, computers, or workstations 104A–E interconnected via a LAN 102. It is to be understood that the LAN 102 may be implemented using any suitable network mechanism including wire and wireless. In the exemplary computer network 100, only two of the nodes 104D and 104E have access to the Internet.

Figure 2:
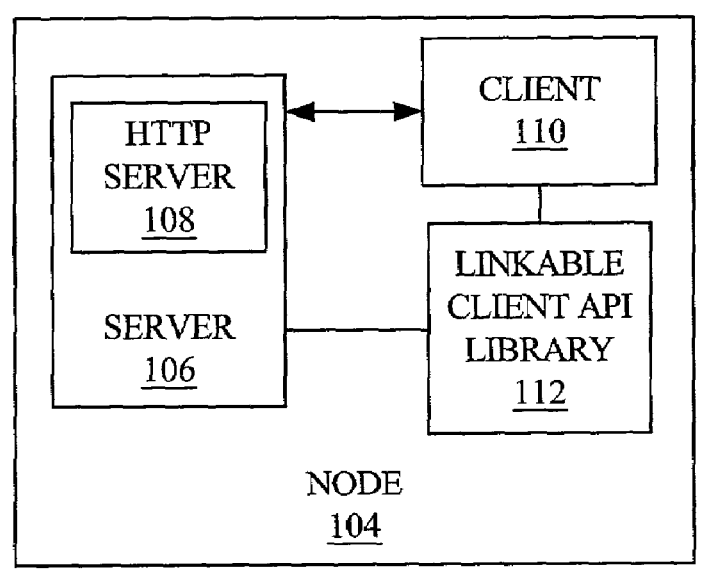
FIG. 2 is a block diagram illustrating an exemplary peering service system and method implemented at a node of the computer network of FIG. 1.

FIG. 2 is a block diagram illustrating an exemplary peering service system and method implemented at a node of the computer network of FIG. 1. As shown, each node 104 provides the functionality of both a server 106 and a client 110. The peering service system utilizes a port, such as port 1967, for transmitting directed or broadcast messages to peers on the network. The server preferably includes an embedded HTTP server 108, typically a micro HTTP server. The HTTP server 108 allows aliased URLs to be accessed by other peers on the network. The HTTP server 108 preferably uses an obscure port such as port 6515 and is preferably restricted to operations required to facilitate distribution of, for example, cached files and uploading of data or requests.

Typically, each node runs both the server and the client. However, each node may run only the client or the server. The peering system and method are preferably implemented as a peering service application ("service" or "service-enabled application") or daemon process. It is noted that a service-enabled application need not be a service application. For example, a service-enabled application may also refer to a service-aware application that fires up, communicates with the service and then shuts down interactively.

The peering system preferably provides a linkable client API library 112 to facilitate communication between the peering service and any service-enabled applications. In one preferred embodiment, the peering system may export the client API library 112 to any service-enabled application such that the service-enabled application may utilize the peering service to discover any type of resource that can be identified with a URL or URI, for example. Alternatively, a given application and the peering service may be tightly coupled so as to eliminate the need for the linkable client API library.

Figure 3:
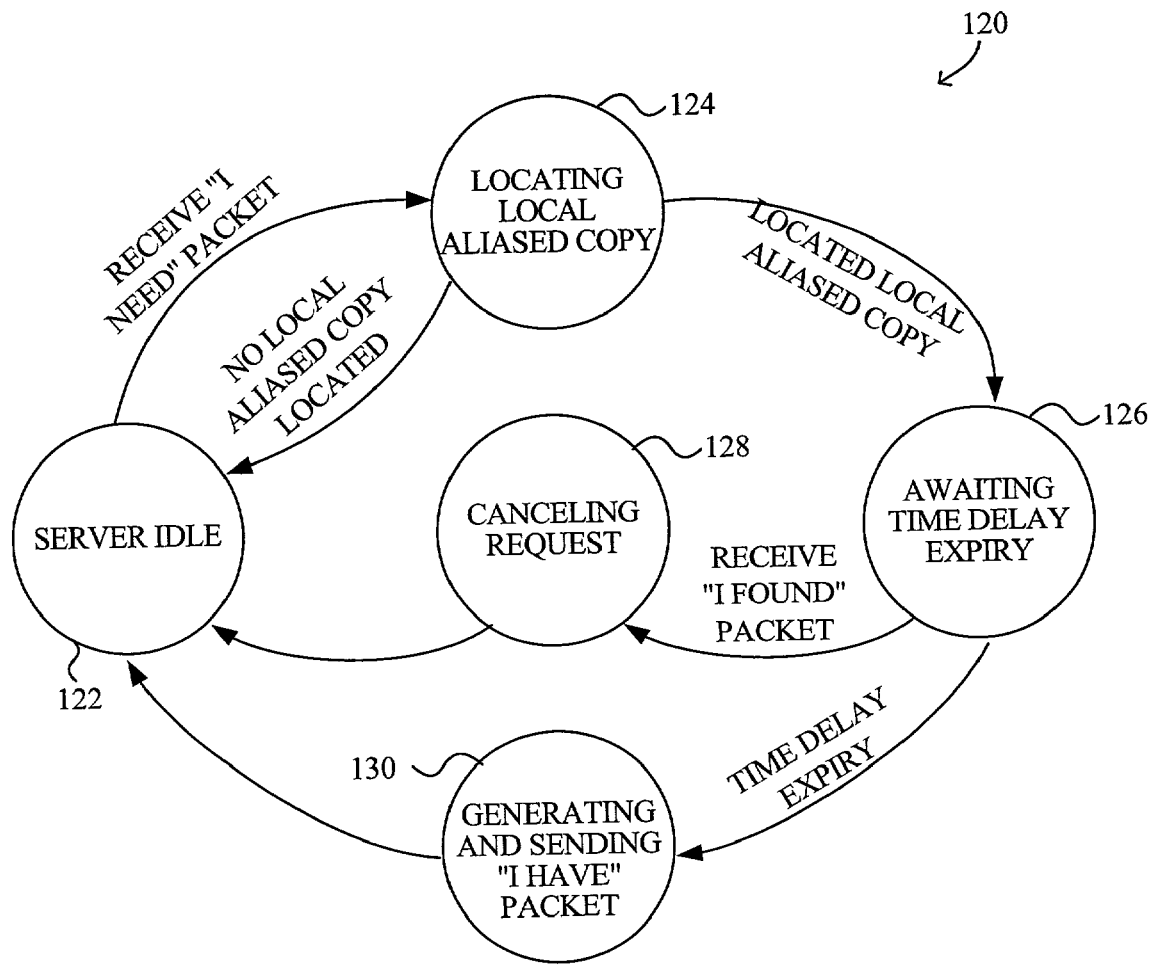
FIG. 3 is a state diagram illustrating states of a typical peering service server in processing a request from a peering client in the peer-to-peer network.

FIG. 3 is a state diagram illustrating states 120 of a typical peering service server in processing a given request from a peering client in the peer-to-peer network. Initially, the service server is in an idle state 122 while listening on a designated port for a broadcast request message from a peer client on the network. When the service server receives a broadcast request message such as an "I need" packet from a peering client on the network, the service server transitions to a locating local aliased copy state 124. In particular, the service server refers to its list of local aliased copies to determine if the service server has a local copy of the requested resource or item identified by, for example, an URL/URI. If the service server determines that it does not have a local copy of the requested resource, then the service server returns to the server idle state 122.

Alternatively, if the service server determines that it has a local copy, the service server preferably waits a randomly generated delay response time period at stage 126. The service server may generate a random number, such as between 0 and 2000, which the service server utilizes as the length of time it waits before responding. In one preferred embodiment, the random number is the number of milliseconds the service server waits before replying to the request. While the service server awaits expiry of the randomly generated delay response time period, the service server listens for a broadcast "I found" packet from the requesting client corresponding to the received request packet. It is noted that regardless of the state of the service server for a given peer request, the service server listens for new requests such as "I need" packets. The broadcast "I found" packet from the requesting client indicates that the requesting client has found the requested resource. If the service server receives an "I found" packet from the requesting client before expiry of the delay response time period, the service server transitions to state 128 to cancel the response to the request and returns to server idle state 122.

Alternatively, if no "I found" packet is received prior to the expiration of the delay response time period, the service server transitions to state 130 to transmit an "I have" packet directly to the requesting peer client. The "I have" packet preferably contains a local alias for the requested object on the service server which the requesting peer can access via the HTTP server of the of the service server. Although not preferred, the service server may alternatively broadcast the "I have" packet over the network rather than transmitting it directly to the requesting client. The service server then returns to the server idle state 122.

As is evident, the randomly generated delay response time period allows multiple peer servers to share loads in an orderly fashion. In particular, randomizing the delay response time period ensures that any given node would not automatically become the default server to a large portion of the peers and eliminates any need for the service server to exercise preferences as to which service clients the service server will supply the requested item. In other words, the random wait time before responding to a request ensures that any one machine does not become an overloaded server of the item or update to the rest of the network. In addition, as a given item is propagated through the network to peers on the network, the load on any one node is likely further reduced. Thus, the system impact on a given service server as it supplies the requested item to service clients can be relatively minimal.

However, it is to be understood that a situation in which multiple service servers each transmitting an "I have" packet in response to a given request packet may occur. For example, a first service server may transmit an "I have" packet upon expiry of its delay response time period. The "I found" packet transmitted or to be transmitted by the requesting peer corresponding to the first "I have" packet may not arrive at the second service server prior to the expiry of its delay response time period, causing the second service server to transmit an "I have" upon expiry of its delay response time period. In such a situation where the requesting client receives multiple "I have" packets from multiple service servers, the requesting client may simply process the first "I have" response and ignore any subsequent "I have" packets it may receive.

Figure 4A:
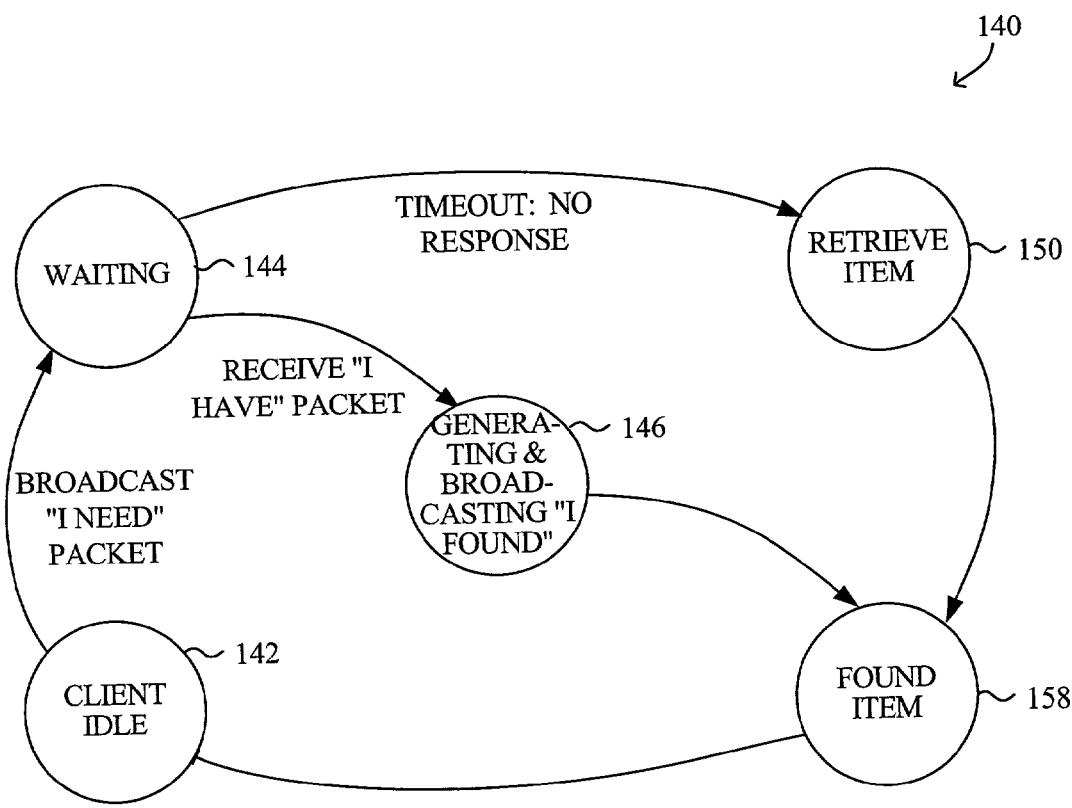
FIGS. 4A and 4B are alternative state diagrams illustrating states of a typical peering service client in requesting a resource over the peer-to-peer network.
Figure 4B:
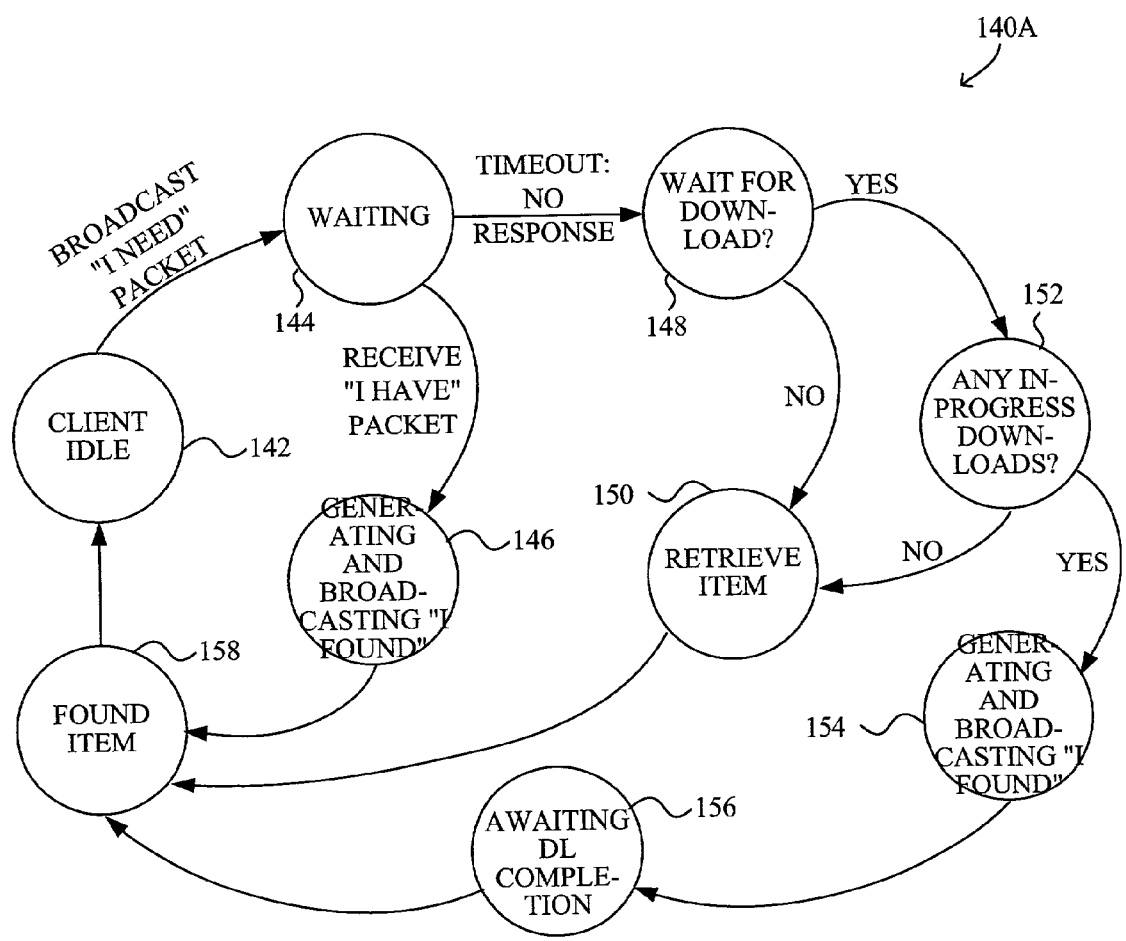

FIGS. 4A and 4B are alternative state diagrams illustrating states 140, 140A of a typical peering service client in making a given request for a resource over the peer-to-peer network. Referring to FIG. 4A, initially, the service client is in an idle state 142. When a service client needs a desired resource, such as an Internet resource, the service client generates and broadcasts an "I need" packet over the peer-to-peer network. For example, the "I need" request may specify an URL (e.g., http://something.tld/someother/thing/here), a protocol (e.g., HTTP protocol), a desired operation (e.g., get operation), and that the requesting peer only wants cached objects.

After broadcasting the "I need" request, the service client transitions to a waiting for response state 144 in which the service client awaits a maximum delay response time period plus a transmission time period for a response from any of the service servers. In the example above where the randomly generated delay response time period ranges between 0 and 2000 milliseconds, the client response waiting time period would be, for example, 2200 milliseconds to allow for a 200 millisecond transmission time period.

If an "I have" response is received from a service server during the client response waiting time, then the service client transitions to state 146 and generates and broadcasts an "I found" message over the network to inform all other peers that the desired resource or item has been found. The service client then transitions to the requested item found state 158. The service-enabled application requesting the item then retrieves the requested item from the responding service server at the location within the network as specified in the received "I have" packet. Generally, the service-enabled application retrieves the requested item through the local HTTP server using, for example, port 6515. Once the service-enabled application successfully retrieves the requested item, the service client informs the service server running on the same machine that a local copy of the resource now exists. The service client then returns to the idle state 142.

Alternatively, if no response is received during the client response waiting time, the service client times out and transitions to state 150 to retrieve the requested item itself such as via the Internet. Once the retrieval is complete, the service client transitions to found item state 158 in which the service client informs the service server running on the same computer or at the same node that a local copy of the resource now exists. The service client then returns to client idle state 142. As is evident, regardless of whether the service client received an "I have" packet from a service server on the network, the client machine can itself become a service server for the requested resource after successful completion of its request.

FIG. 4B illustrates the 140A states of a typical service in a preferred alternative embodiment particularly suitable for applications that include downloading of files. States 140A includes the states as shown and described with reference to FIG. 4A plus additional states for dealing with currently in-progress downloads of the requested item by other peers. These additional states allow a peer node to complete downloading the requested resource and then distribute it immediately and automatically upon download completion to the requesting service client.

In particular, instead of directly transitioning to state 150 to retrieve the requested item itself after the service client times out the request, the service client transitions to "wait for download?" state 144 in which the service client determines whether it can or will wait for completion of any in-progress download of the requested item by another peer. If not, then the service client transitions to state 150 to retrieve the requested item itself and continues with state transitions similar to that described above with reference to FIG. 4A.

If the service client determines that it can or will wait for the completion of any in-progress download, the service client transitions to "any in-progress downloads?" state 152. If there are no such in-progress downloads of the requested item, then the service client transitions to state 150 to retrieve the requested item itself and continues with state transitions similar to that described above with reference to FIG. 4A.

Alternatively, if there is at least one in-progress download of the requested item, then the service client transitions to state 154 in which it generates and broadcasts an "I found" message. The service client then transitions to state 156 to await completion of the in-progress download of the requested item. Upon completion of the in-progress download of the requested item, the service client transitions to the requested item found state 158. The service client retrieves the requested item from the local location within the network. After successful completion of its request, the service client will inform the service server running on the same machine that a local copy of the resource now exists. The service client then returns to the idle state 142.

As is evident, in order for the service client to determine if there are any in-progress downloads in state 152, a service client that is downloading a file for a service-enabled application preferably broadcasts a "downloading" message and/or directly responds to the client server of a broadcast "I need" request with a "I am downloading" rather than an "I have" response message. In one preferred embodiment, the service client may set a downloading flag for the corresponding file to true.

In addition, the service-enabled application preferably transmits periodic progress packets to any node that is waiting for the resource being downloaded such that those nodes may interactively display download progress information to end users at state 156. Alternatively, the service-enabled application may broadcast such periodic download progress packets over the network. Thus, a node in the retrieve item state 150 preferably periodically transmits a "downloading" message that includes progress information.

Service Functionality and Service Packet Format

One functionality provided by the peering service is that of a central clearing house for formatting, sending, receiving and decoding service packets, such as for "I need," "I found," and "I have" packets. In other words, the peering service manages the peer-to-peer communication process for obtaining requested items. The specific functionality invoked by a given service packet itself is generally dependent on the specific service-enabled application.

The communication protocol used in broadcasts (e.g., "I need" and "I found" packets) and responses (e.g., "I have" packets) is typically TCP/IP. Each packet is typically approximately 200 bytes in size and contains the node ID of the sender as well as any other suitable information. Transfer of the requested item from the service server to the service client is typically via HTTP.

The service packet format is preferably based upon the well-accepted and widely utilized XML format. For example, an XML service packet format may include a service identification and various key-value pairs, including those inserted by the service as well as those defined by the corresponding service-enabled application.

Various key-value pairs may be inserted by the peering service into each service packet. Examples of suitable key-value pairs include identification, type, and version key-value pairs. Specifically, an identification key-value pair identifies each request and responses corresponding to the request. In general, the identification value is unique on the originating node but need not be unique on the network as a whole. The range of values for the identification value may depend upon the number of bits assigned thereto. For example, 32 bits or four octets may be assigned to the identification value and thus the identification value would range from 0 to $2^{31}$. With respect to the type key-value pair, the type value is typically either request, end-request, response, and/or any application-defined value. Any other suitable application-defined key-value pairs may also be includes in the service packet.

An exemplary service packet may be:

```
<service type="request" version="1.0" ID="1111"
    method="get" href="http:/domain.com/what-
    ever" acceptprotocol="http"/>
```

Figure 5:
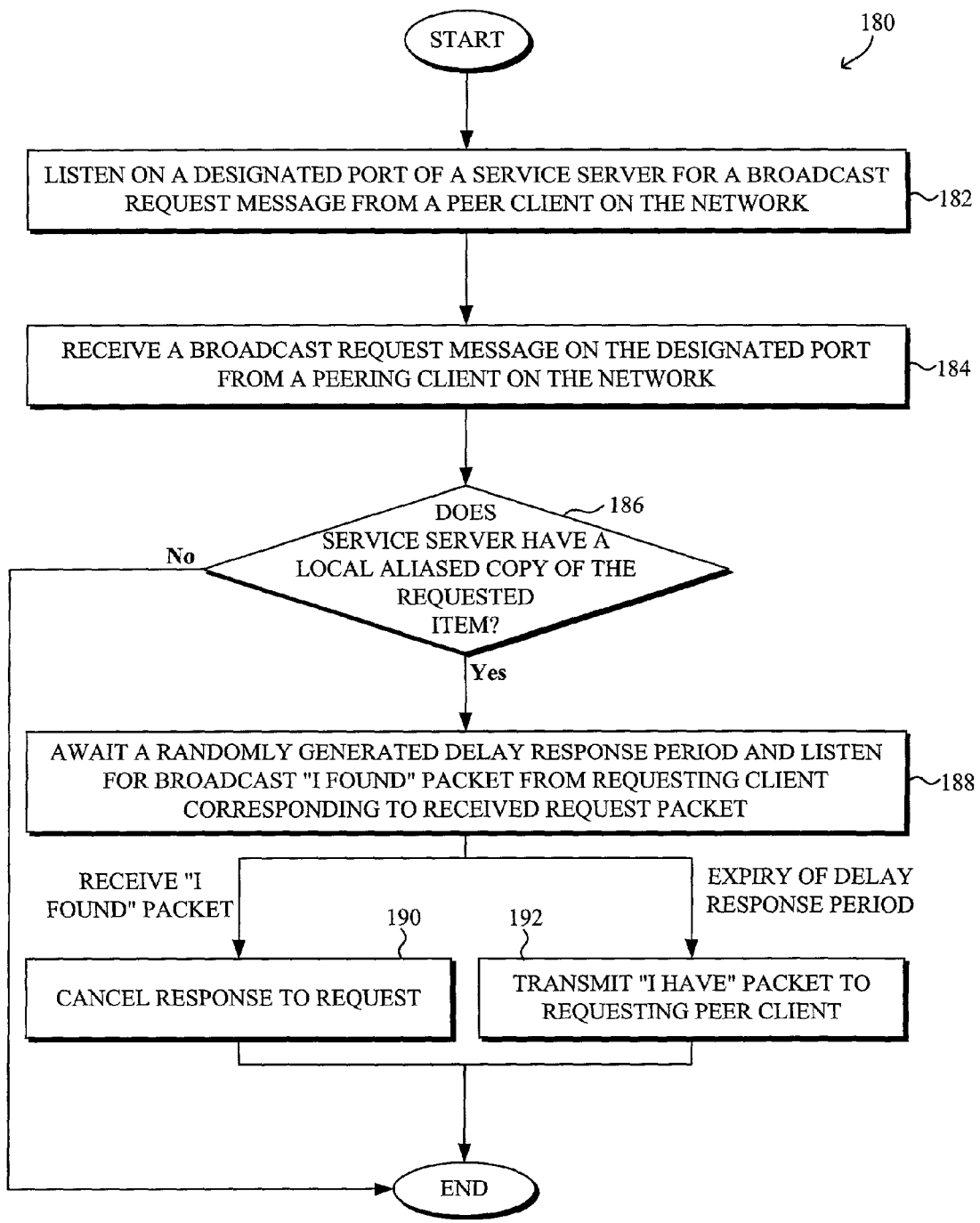
FIG. 5 is a flowchart illustrating a typical process of a peering service server in processing a request from a peering client in the peer-to-peer network.

FIG. 5 is a flowchart illustrating a typical process 180 of a peering service server in processing a request from a peering client in the peer-to-peer network. At step 182, the service server is listening on a designated port for a broadcast request message from a peer client on the network. At step 184, the service server receives a broadcast request message on the designated port such as an "I need" packet from a peering client on the network. At step 186, the service server determines if it has a local aliased copy of the requested item. In particular, the service server refers to its list of local aliased copies to determine if the service server has a local version of the requested resource or item, such as an URL/URI.

If the service server determines that it does not have a local copy of the requested resource, then the process 180 is complete. Alternatively, if the service server determines that it has a local copy, the service server preferably waits a randomly generated delay response time period while listening for a broadcast "I found" packet from the requesting client corresponding to the received request packet at step 188. As discussed above, the service server may generate a random number between 0 and 2000 as the length of time in milliseconds it waits before responding. The broadcast "I found" packet from the requesting client indicates that the requesting client has found the requested resource.

It is noted that throughout the process 180, the service server is preferably continuously listening for any additional broadcast request messages and performs process 180 for each received broadcast request message as they are received.

If the service server receives an "I found" packet from the requesting client before expiry of the delay response time period, the service server cancels the response to the request at step 190 and the process 180 is complete. Alternatively, if no "I found" packet is received prior to the expiration of the delay response time period, the service server transmits an "I have" packet directly to the requesting peer client at step 192 and the server process 180 is complete. The "I have" packet preferably contains a local alias for the requested object on the service server.

Figure 6:
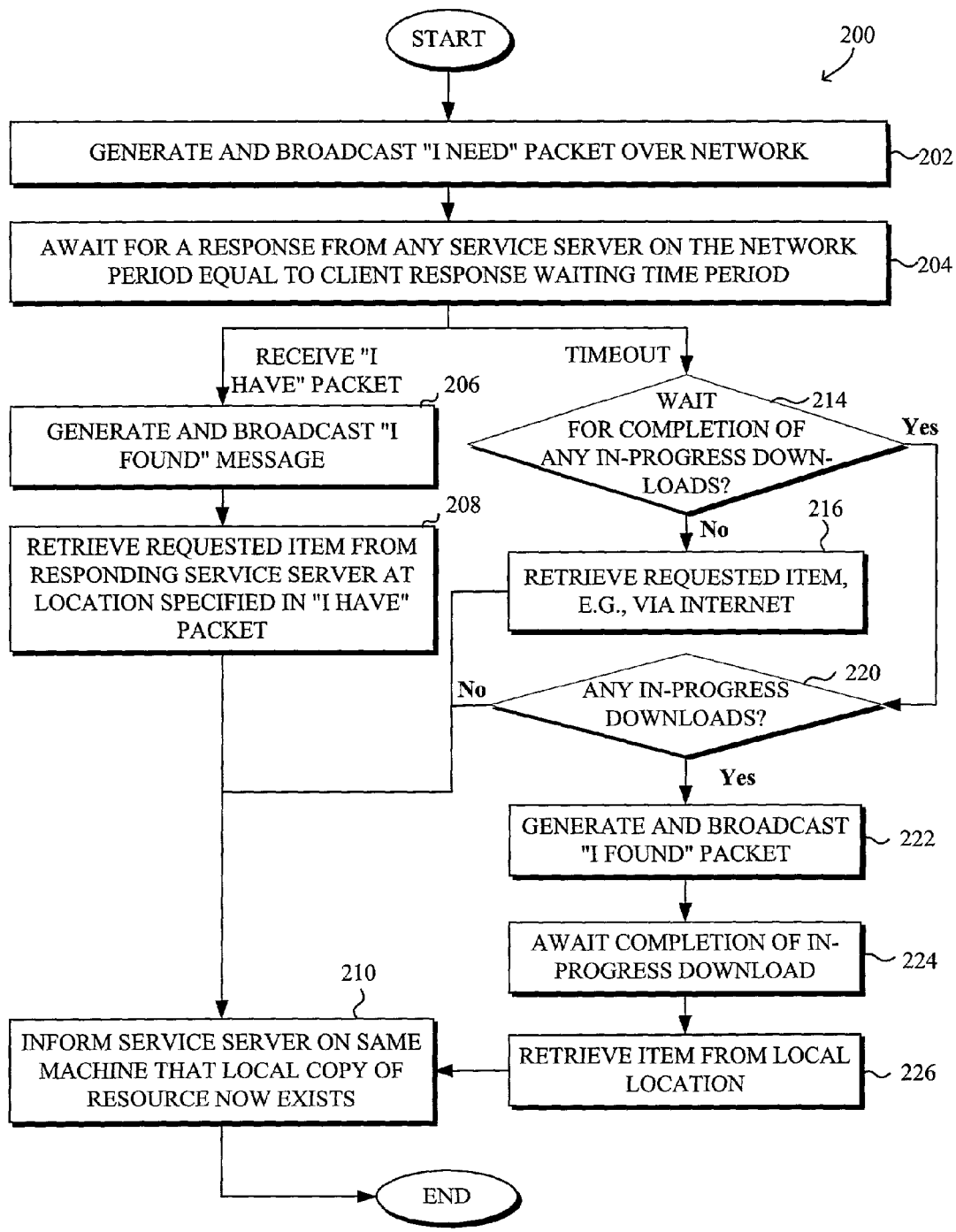
FIG. 6 is a flowchart illustrating a typical process of a peering service client in requesting a resource over the peer-to-peer network.

FIG. 6 is a flowchart illustrating a typical process 200 of a peering service client in requesting a resource over the peer-to-peer network. At step 202, the service client generates and broadcasts an "I need" packet over the peer-to-peer network on a designated port. At step 204, the service awaits for a response from any of the service servers on the network for a period equal to a client response waiting time period, typically a maximum delay response time period plus a transmission time period,.

If an "I have" response is received from a service server during the client response waiting time, then the service client generates and broadcasts an "I found" message over the network at step 206. The service-enabled application requesting the item then retrieves the requested item from the responding service server at the location within the network as specified in the received "I have" packet at step 208. Once the service-enabled application successfully retrieves the requested item, the service client informs the service server running on the same machine that a local copy of the resource now exists at step 210. The process 200 is then complete.

Alternatively, if no response is received during the client response waiting time, i.e., the service client times out, the service client determines if the service-enabled application can or will wait for completion of any in-progress download of the requested item by another peer at step 214. If not, the service client retrieves the requested item itself such as via the Internet at step 216 and then proceeds to step 210 to complete the process 200.

If the service client determines that it can or will wait for the completion of any in-progress download, the service client determines whether there are any in-progress downloads at step 220. If there are no such in-progress downloads of the requested item, the service client then proceeds to step 210 to complete the process 200.

If there is at least one in-progress download of the requested item, then the service client generates and broadcasts an "I found" message at step 222. The service client then awaits completion of the in-progress download of the requested item at step 224. For example, the service client may receive an "I have" or a "Download complete" message from the downloading peer.

Figure 7:
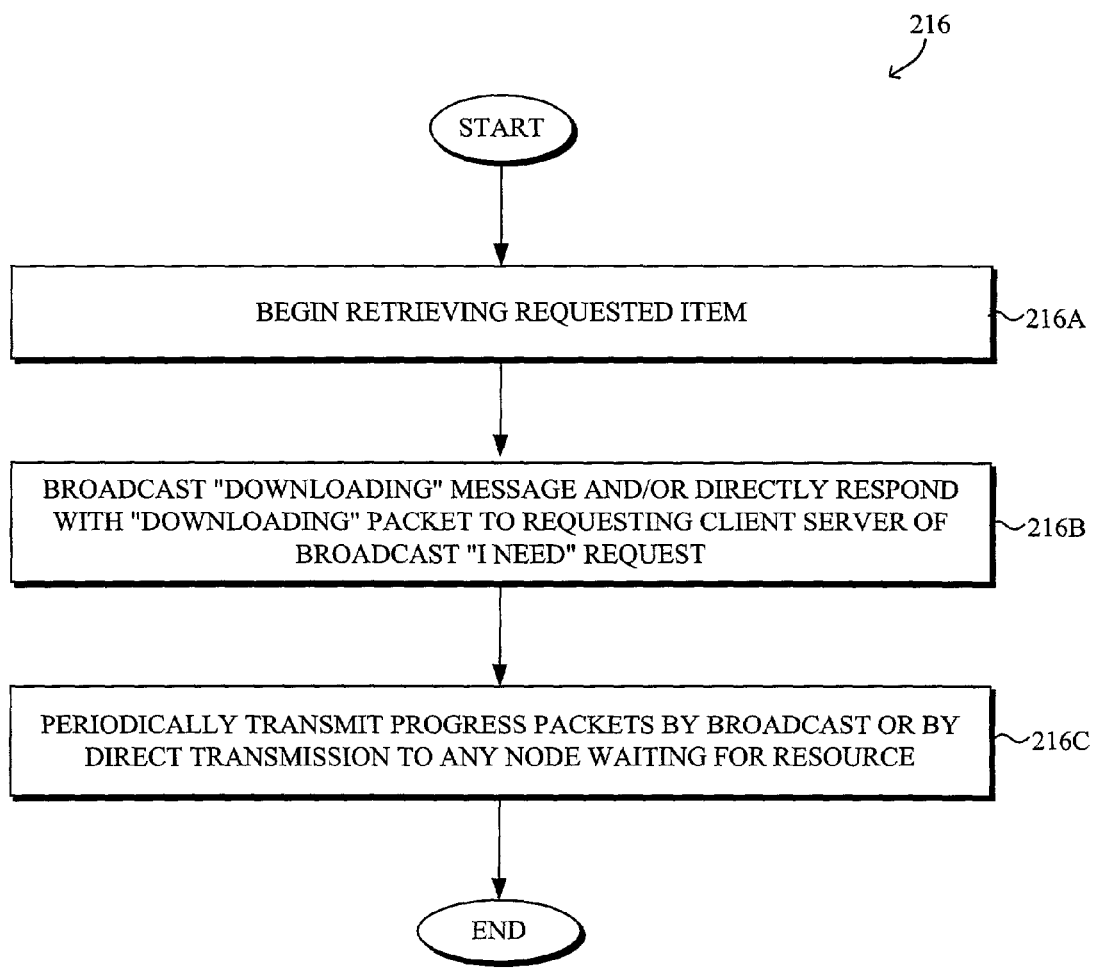
FIG. 7 is a flowchart illustrating a preferred embodiment of the retrieve step of FIG. 6 in more detail.

Upon completion of the in-progress download of the requested item, the service client retrieves the requested item from the local location within the network at step 226. After successful completion of its request, the service client then proceeds to step 210 to complete the process 200. It is noted that steps 214 and 220–226 can be optional and preferably implemented for applications that include downloading of files As is evident, in order for the service client to determine if there are any in-progress downloads at step 220, a service client that is downloading a file for a service-enabled application from outside of the network, e.g., from the Internet, notifies its peers on the network that a downloading process is in progress. For example, FIG. 7 is a flowchart illustrating a preferred embodiment of the retrieve step 216 in more detail.

As shown, the service client begins retrieving the requested item at step 216A. At step 216B, the service client may broadcast a "downloading" message and/or directly respond with a "I am downloading" response message to any client server that transmitted a broadcast "I need" request. In addition, the service client preferably also periodically transmits progress packets at step 216C either by broadcast or by direct transmission to any node that is waiting for the resource such that those nodes may interactively display download progress information to end users at those nodes. Alternatively, steps 216B and 216C may be combined into a single periodic packet transmission in which each packet is a "downloading" message that includes progress information.

Service-Enabled Product Updating Application

One exemplary implementation of the peering service described herein is a product updating service implementation and a service-enabled application having a shared agent. The agent is shared by an anti-virus application and a firewall application. The peering service is encapsulated in a single DLL that contains components for performing an update service, namely, a peering server having an HTTP server, a peering client, and a product updating service.

The product updating service determines what updates, if any, to request. If the product updating service determines that an update is necessary, the service client broadcasts an "I need" packet to request a specific URL for the necessary product updates. In other words, the peering service provides a mechanism for keeping service-enabled application, its engine, and its virus signature files up-to-date.

In particular, when a first computer or node boots, its product updater broadcasts an "I need" packet requesting for myupdate.cab file at a specified URL. The myupdate.cab file, e.g., approximately 7–8 k in size, contains a script with instructions on how to check the current version of the product, engine, and virus signature files against the latest available version so that the product updater can determine if an update is necessary. This file may not be cacheable, so the service servers may not be able to offer it and can instead be obtained directly via the Internet.

If the product updating service determines, based on the myupdate.cab file, that an update is necessary, the product updating service, via the peering service, broadcasts an "I need" packet over the network. An update may include engine, DAT, and/or product updates. For any update files that are downloaded, whether directly from the Internet and/or from one or more of the peers on the network, the product updating service preferably checks to ensure that the updates have been digitally signed. Once the updates are authenticated, they are installed at the requesting node.

The product update service checks for updates at any suitable pre-defined intervals and/or upon occurrence of various events. For example, the product update service may check for updates upon boot or 5 minutes after boot, 6 hours after each unsuccessful check, and/or upon a scheduled basis such as once a day, once every 12 hours after each successful check.

An update can include virus signature files (DATs), engine, and/or product update. DATs are typically updated weekly, such on a particular day of the week and are approximately 900–950 k in size on average. The engine is usually updated every 2 to 3 months and is approximately 550–600 k in size on average. The product is updated as hotfixes become available, typically every 6–8 weeks, or as new versions become available, typically every 4–6 months, and is approximately 700–750 k in size on average.

In the current example, a complete update, including engine, virus signature files and product, comprises of six *.cab files, totaling approximately 2.25M. The six *.cab files for an update and their respective average sizes are listed below:

| | |
|---|---|
| Myavdat.YYMMDDHHMM.cab | average 910k |
| Myxtrdat.YYMMDDHHMM.cab | average 16k |
| Mycioagt.YYMMDDHHMM.cab | average 370k |
| Vsasap.YYMMDDHHMM.cab | average 360k |
| Vseng9x.YYMMDDHHMM.cab | average 240k |
| Vsengine.YYMMDDHHMM.cab | average 340k |

As any number of these *.cab files may need to be updated, each file is preferably requested via the peering service in a separate transaction. Thus, some or all of the needed *.cab file may be pulled from different nodes and/or the Internet.

Figure 8:
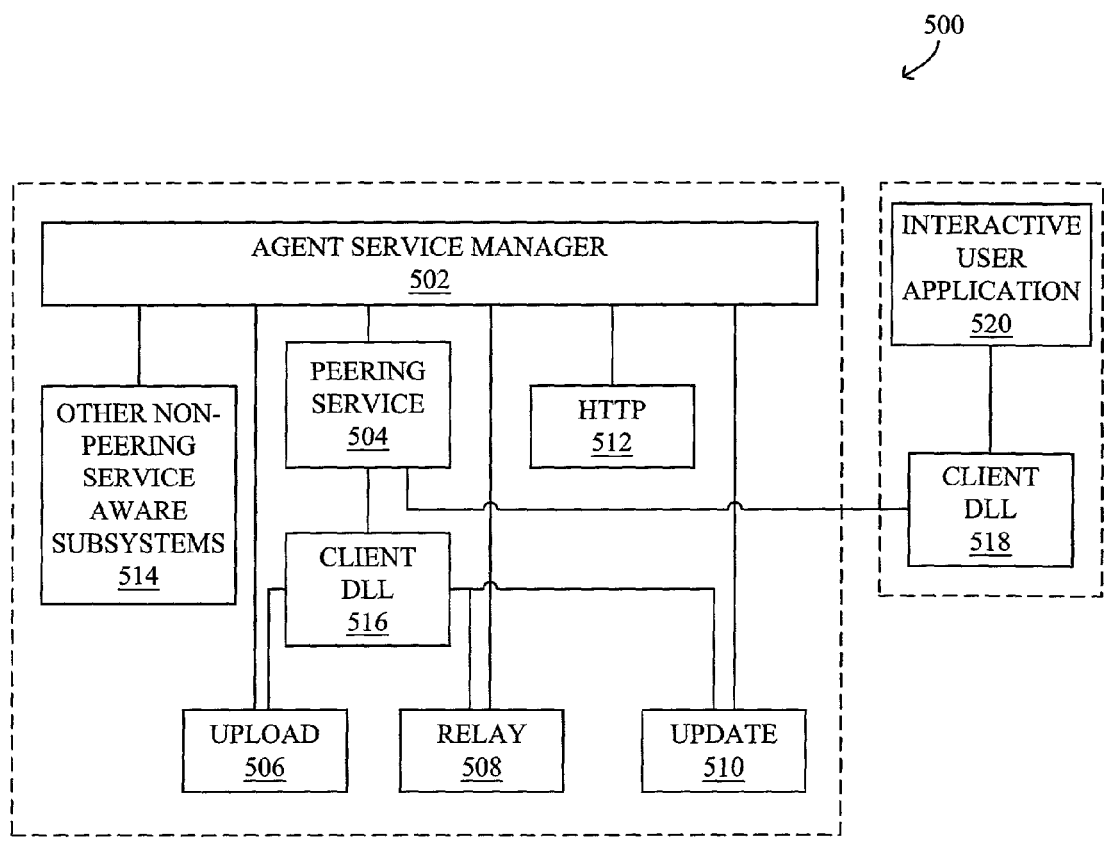
FIG. 8 is a block diagram illustrating a typical shared agent architecture with various peering service-aware applications and non-peering service aware applications.

The peering service described herein is not limited to an updating service but may be implemented with various other peering service-aware applications. FIG. 8 is a block diagram illustrating a typical shared agent architecture 500 with various peering service-aware applications and non-peering service aware applications in which dashed lines represent process boundaries. As shown, an agent service manager 502 manages the peering service 504, various peering service-aware applications such as upload, relay, and update services, 506, 508, 510, respectively, as well as other non-peering service aware applications such as HTTP server 512 and other such subsystems 514. As shown a client DLL serves as an interface between the peering service 504 and peering-aware services. In particular, a client DLL 516 serves as an interface between the peering service 504 and peering-aware upload, relay, and update services, 506, 508, 510, respectively. In addition, a client DLL 518 serves as an interface between the peering service 504 and an interactive user application 520.

Service Performed by a Peer on Behalf of Another Peer in a Peer-to-Peer Environment An upload service is an example of a service that may need to be performed by a peer behalf of another peer such as where some peers are restricted from accessing the Internet (as shown in FIG. 1). For example, typical anti-virus applications require that the software application periodically contact the vendor server and report its current version and/or any application-specific data, i.e., uploading of files. In the case of anti-virus applications, the uploading of files typically includes reporting viruses caught and the current DAT version.

The upload subsystem (as shown in FIG. 8) is responsible for sending files such as reports from the client node to the vendor's backend servers. These reports are often XML files formatted in a way understood by the backend parser. To send the report, a properly formatted XML file is placed in the upload directory of the upload subsystem and the upload subsystem sends the file to the application vendor server via the Internet. If a given node is restricted from accessing the Internet, the node may perform upload task via a Internet-connected peer on the network if the upload subsystem is peering-system enabled.

As is evident, service-enabling the upload application allows the upload subsystem at a non-connected node to locate and perform tasks requiring Internet access via an upload subsystem at an Internet-connected node. In particular, an Internet-connected peer node running the upload subsystem could respond to the requesting node with an accessible alias for a post operation. To reduce unnecessary network traffic, it may be desirable to require an upload subsystem at each node to optionally attempt a direct upload by default before broadcasting an upload request through the peering service.

The peering-enabled upload subsystem provides local aliases for "POST" operations similar to "GET" operations as described above. When an application residing at a non-connected node needs to perform a "POST" operation, the application performs an alias lookup via the peering service. To perform the alias lookup, the peering service broadcasts an "I need" packet that preferably includes method=POST and URL set to the upload URL. The upload subsystem on an-Internet connected peer may reply to this request with a local alias that points to a vendor HTTP service server residing at the connected node. Typically, this vendor HTTP server already uploads any files in its local upload directory. The HTTP post operation simply places the file into the local upload directory as a uniquely named XML file. The existing upload functionality on the connected peer then uploads the file to the vendor backend server via the Internet.

However, such a process poses new security risks. For example, it may be possible for a malicious machine on the LAN to spoof service clients into believing it will upload for the requesting peer and then throw away, corrupt and/or misdirect the reports. Thus, in addition to using the peering service for upload services, the peering service preferably implements a method for securely confirming performance of a task by a peer.

Figure 9:
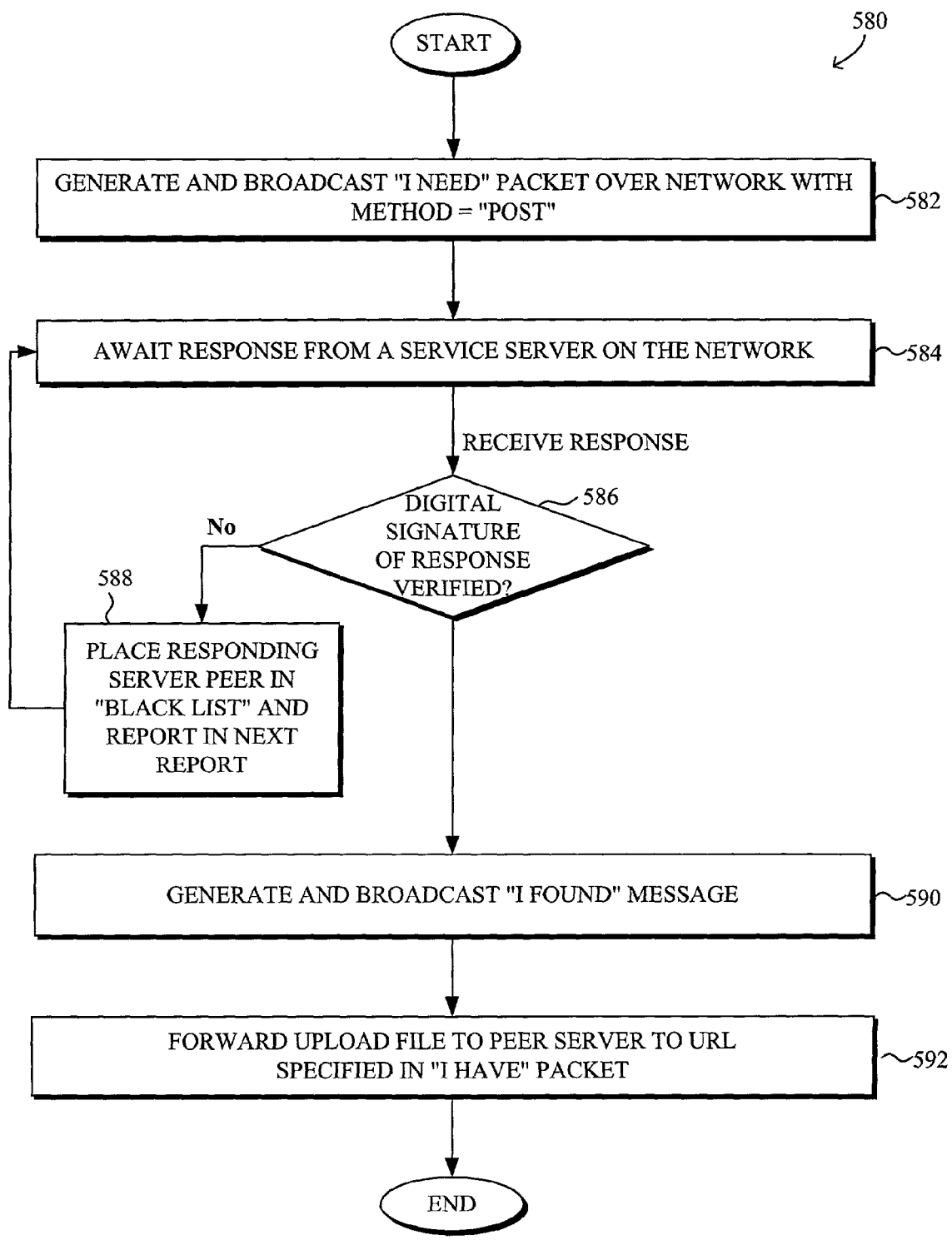
FIG. 9 is a flowchart illustrating an exemplary process implemented by a node for verifying that a responding peer is a trusted peer using signed receipts in a peer-to-peer network environment.

FIG. 9 is a flowchart illustrating a exemplary process 580 implemented by a node for verifying that a responding peer is a trusted peer using signed receipts in a peer-to-peer network environment. FIG. 9 illustrates the process from a point of view of a non-connected service requesting peer.

At step 582, the service requesting peer generates and broadcasts an "I need" packet over the network. The "I need" packet preferably specifies method=POST and URL set to the upload URL. At step 584, the service requesting peer awaits an "I have" response communication from a service server on the network.

When a response is received, the requesting peer determines whether the response contains a digital certificate issued by the vendor backend that indicates that the vendor backend has recently approved the aliased URL for the specified use, i.e., the requested task at step 586. Specifically, the response from the service server contains a local alias URL that points to a local upload directory for a vendor HTTP service server residing at the connected responding server node as well as a digital certificate. The digitally signed response may be signed by any suitable mechanism such as a 1024-bit VeriSign digital certificate. In particular, the requesting peer requires that the responding upload server provide a digital certificate issued from the backend server that indicates that the responding server is trusted. The required information may be contained in a single "I have" response communication or multiple communications. The requesting peer may include a request for the digital certificate in its initial "I need" request packet. Alternatively, the requesting peer may respond to the "I have" packet from the responding server with a request for the digital certificate in a separate communication.

If the digital certificate of the response communication is not or cannot be verified at step 586, then the requesting peer may optionally place the responding server peer in a "black list" and report the responding server peer in a next report. The "black list" may be utilized by the requesting peer, for example, to prevent forwarding of any files to the servers listed in the "black list." The process then returns to step 584 to await a response from another service provider. Although not shown, steps to account for a situation where no satisfactory response is received by the requesting peer after a predetermine period of time may be implemented so as to end a process that cannot be successfully completed.

Alternatively, if the digital certificate of the response communication is verified at step 586, then the requesting peer preferably generates and broadcasts an "I found" message at step 590. At step 592, the requesting peer forwards the file to be uploaded to the responding service server at the alias URL specified in the response communication. The process at the requesting peer is then complete.

The responding service server generally has a peering service-enabled uploading service residing at the node. Typically, the vendor HTTP server at the responding server node already performs the task of uploading files from its local upload directory to the vendor backend server. The HTTP post operation simply places the file into the local upload directory as a uniquely named XML file. The existing upload functionality on the responding server machine then uploads the file to the vendor backend server via the Internet.

Thus, the requesting peer requires verification that the responding service server is trusted to perform the requested task using signed certificates upon contact with the service provider. The verification is performed prior to the requesting peer accepting the service-supplied alias and prior to the requesting peer forwarding the data to be uploaded to the responding service server.

As illustrated in the description above, the peering service facilitates in reducing or minimizing the number of service clients that have to obtain files or other resources such as product update files via the Internet by using secure, peer-to-peer communication to distribute the files among client machines on a network, such as a LAN, via an intranet. The peering service enables secure, automatic distribution of the update files between service clients, independent of a network administrator or end-user, to keep the anti-virus and firewall application/service up-to-date with minimal impact to network bandwidth.

Often, many computers on a network do not have the most up-to-date anti-virus and/or firewall files. Using the secure peering service allows for automatic and secure updating of such files and also reduces or eliminates the need for a network administrator to script anti-virus file updates. Furthermore, by efficiently spreading load and utilizing resources across a local network over a high-speed LAN, a bandwidth crunch resulting from the computers pulling update files from the Internet is largely reduced. Thus, the peering service allows for ease of distribution of product upgrades and updates with a minimal number of computers requiring to connect to the Internet to obtain the necessary files resulting in a reduced usage of Internet bandwidth.

The peering service also allows a given client to pull the data files from any node on the network, rather than having to connect to a centralized server that might require several additional network hops, resulting in an optimal use of network bandwidth to distribute updates.

Figure 10:
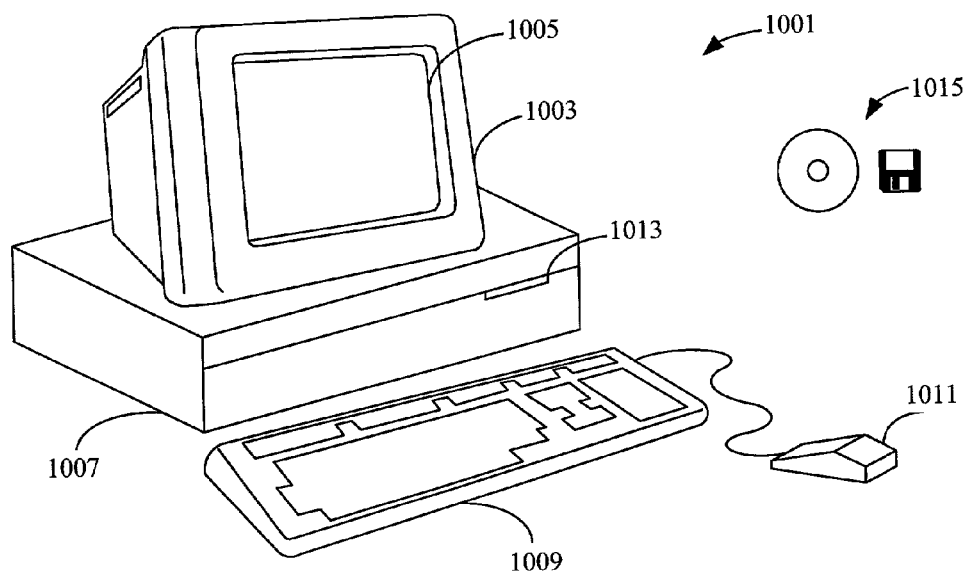
FIG. 10 illustrates an example of a computer system that can be utilized with the various embodiments of method and processing described herein.
Figure 11:
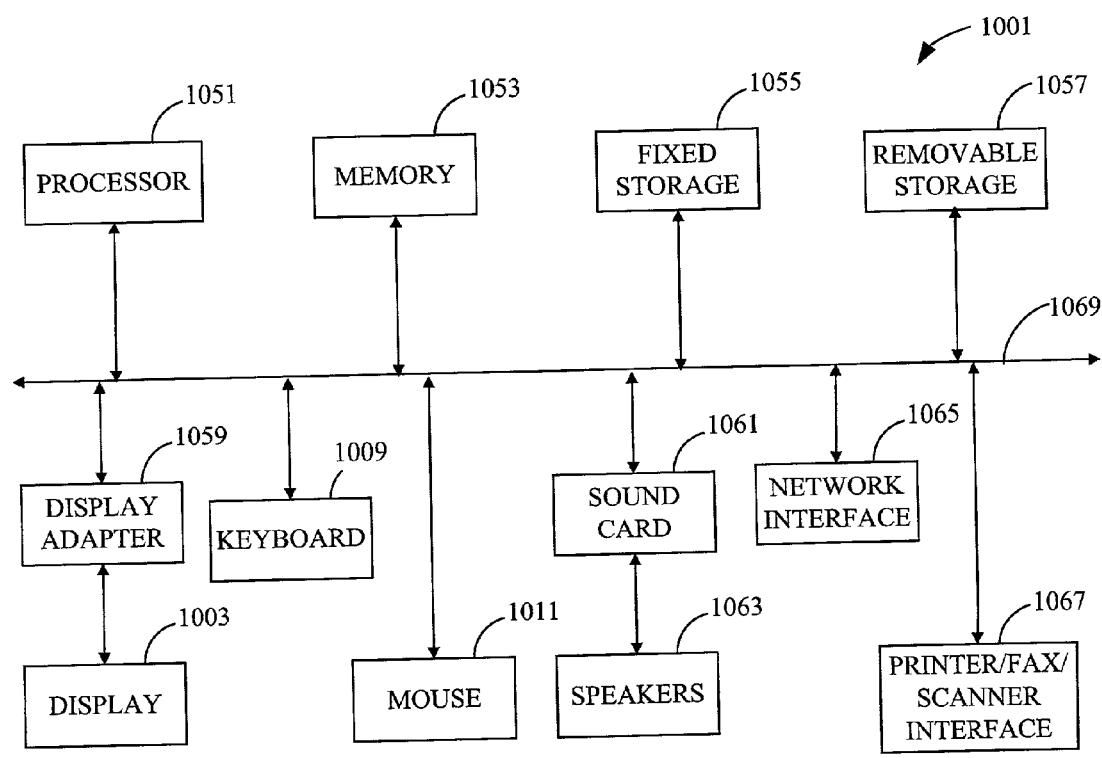
FIG. 11 illustrates a system block diagram of the computer system of FIG. 10.

FIGS. 10 and 11 illustrate a schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 1055, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instructions, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for verifying trusted status of a service-providing server in a peer-to-peer network, comprising:
   broadcasting a request over the network by a requesting peer for a task with respect to a remote non-local backend server;

receiving a response to the request from the service-providing server;

verifying a digital certificate of the response issued by the remote non-local backend server indicating that the responding service-providing server is trusted for the requested task;

forwarding the task to a local alias URL of the responding peer for performance of the task by the responding server if said verifying is successful; and awaiting for another response from another service-providing server if the verifying is unsuccessful;

wherein said verifying verifies that the local alias URL is approved by the non-local backend server for the requested task;

wherein a message is broadcasted indicating that the requesting peer has located the responding service-providing server;

wherein the local alias URL points to a local upload directory for a HTTP service server residing at a responding server node;

wherein the request specifies a post method that places data into the local upload directory as a uniquely named file.

2. A method for verifying trusted status of a service-providing peer of claim 1, wherein the digital certificate is a 1024-bit VeriSign digital certificate.

3. A method for verifying trusted status of a service-providing peer of claim 1, further comprising placing the responding server node in a black list of the requesting peer for the requested task if said verifying is unsuccessful.

4. A method for verifying trusted status of a service-providing peer of claim 1, wherein the task is an uploading task and wherein said forwarding the task to the local alias URL includes forwarding the file to be uploaded to the remote non-local backend server.

5. A computer program product for verifying trusted status of a service-providing peer in a peer-to-peer network, comprising:

computer code that broadcasts a request over the network by a requesting peer for a task with respect to a remote non-local backend server;

computer code that receives a response to the request from the service-providing server;

computer code that verifies a digital certificate of the response issued by the remote non-local backend server indicating that the responding service-providing server is trusted for the requested task;

computer code that forwards the task to a local alias URL of the responding peer for performance of the task by the responding server if said verifying is successful; and computer code that awaits for another response from another service-providing server if the verifying is unsuccessful; and a computer readable medium that stores said computer codes;

wherein said verifying verifies that the local alias URL is approved by the non-local backend server for the requested task;

wherein a message is broadcasted indicating that the requesting peer has located the responding service-providing server;

wherein the local alias URL points to a local upload directory for a HTTP service server residing at a responding server node;

wherein the request specifies a post method that places data into the local unload directory as a uniquely named file.

6. A computer program product for verifying trusted status of a service providing peer of claim 5, wherein the digital certificate is a 1024-bit VeriSign digital certificate.

7. A computer program product for verifying trusted status of a service-providing peer of claim 5, further comprising computer code that places the responding server node in a black list of the requesting peer for the requested task if said verifying is unsuccessful.

8. A computer program product for verifying trusted status of a service-providing peer of claim 5, wherein the task is an uploading task and wherein computer code that forwards the task to the local alias URL includes computer code that forwards the file to be uploaded to the remote non-local backend server.

9. A system for verifying trusted status of a service-providing server in a peer-to-peer network, comprising:

means for broadcasting a request over the network by a requesting peer for a task with respect to a remote non-local backend server, means for receiving a response to the request from the service-providing server;

means for verifying a digital certificate of the response issued by the remote non-local backend server indicating that the responding service-providing server is trusted for the requested task;

means for forwarding the task to a local alias URL of the responding peer for performance of the task by the responding server if said verifying is successful; and means for awaiting for another response from another service-providing server if the verifying is unsuccessful;

wherein said verifying verifies that the local alias URL is approved by the non-local backend server for the requested task;

wherein a message is broadcasted indicating that the requesting peer has located the responding service-providing server;

wherein the local alias URL points to a local upload directory for a HTTP service server residing at a responding server node;

wherein the request specifies a post method that places data into the local upload directory as a uniquely named file.

10. A system for verifying trusted status of a service-providing peer of claim 9, wherein the digital certificate is a 1024-bit VeriSign digital certificate.

11. A system for verifying trusted status of a service-providing peer of claim 9, further comprising means for placing the responding server node in a black list of the requesting peer for the requested task if said verifying is unsuccessful.

* * * * *

UNITED STATES PATENT AND TRADEMARK OFFICE
CERTIFICATE OF CORRECTION

PATENT NO. : 7,055,036 B2 Page 1 of 1
APPLICATION NO. : 09/922329
DATED : May 30, 2006
INVENTOR(S) : Kouznetsov et al.

It is certified that error appears in the above-identified patent and that said Letters Patent is hereby corrected as shown below:

Col. 16, line 5, replace "unload" with -- upload --;
    Col. 16, line 25, replace "server," with -- server; --.

Signed and Sealed this

Twelfth Day of October, 2010

David J. Kappos
*Director of the United States Patent and Trademark Office*